United States Patent [19]

Mackert et al.

[11] 4,099,368
[45] Jul. 11, 1978

[54] GATHERING UNIT CONTROL APPARATUS

[75] Inventors: Robert J. Mackert, Downers Grove; Donald P. Storm, Hinsdale; Manfried L. Hoch, Lockport, all of Ill.

[73] Assignee: International Harvester Company, Chicago, Ill.

[21] Appl. No.: 712,307

[22] Filed: Aug. 6, 1976

[51] Int. Cl.² .............................................. A01D 67/00
[52] U.S. Cl. ...................................... 56/208; 56/15.8; 56/15.9
[58] Field of Search ........................ 56/208, 15.7, 15.8, 56/15.9, 13.9, 16.1

[56] References Cited

U.S. PATENT DOCUMENTS

| 3,355,865 | 12/1967 | Waldrop | 56/208 |
| 3,512,347 | 5/1970 | White et al. | 56/208 |
| 3,699,754 | 10/1972 | Koch et al. | 56/15.8 |
| 3,834,142 | 9/1974 | Johnston et al. | 56/15.8 X |

FOREIGN PATENT DOCUMENTS

| 1,402,653 | 8/1975 | United Kingdom | 56/208 |

Primary Examiner—Jay N. Eskovitz
Attorney, Agent, or Firm—Dennis K. Sullivan; F. David AuBuchon

[57] ABSTRACT

A control apparatus is provided for controlling a gathering unit mounted on a forage harvester for vertical articulative movement about a transverse axis thereon, the control apparatus including a main lever pivotally mounted on the forage harvester frame and operatively attached by a tension apparatus to the gathering unit, a lifting apparatus interconnecting the frame and main lever through a lost motion connection for selectively engaging the main lever to lift the gathering unit, a floatation spring lever having a first pivotal connection and a second detachable connection with the main lever, and a floatation spring assembly interconnecting the spring lever and the frame, the floatation spring assembly counterbalancing a portion of the weight of the gathering unit when the detachable connection between the spring lever and the main lever is attached and being ineffective when the detachable connection is detached. The tension apparatus comprises a single tension member having its ends operatively connected to the gathering unit on each side of the crop inlet and its medial portion operatively engaging a pulley attached to the main lever in order to equalize the loading on the lifting apparatus.

15 Claims, 7 Drawing Figures

GATHERING UNIT CONTROL APPARATUS

CROSS REFERENCE TO RELATED APPLICATIONS

This application is related to application Ser. No. 698,372 filed June 21, 1976 entitled "Gathering Unit Attaching Apparatus" by Manfried L. Hoch, Edward A. Fritz, and Peter Sammarco, and assigned to the assignee hereof.

BACKGROUND OF THE INVENTION AND THE PRIOR ART

This invention relates to forage harvesters of the type having a basic processing unit and a gathering unit attached thereto for vertical swinging movements about a transverse axis on the basic unit frame and, more particularly, to an apparatus for controlling the swinging movements of the gathering unit.

Conventional forage harvesters are provided with gathering units which are designed to follow the ground by pivoting about a transverse axis on the frame of the basic processing unit. The gathering unit control apparatus in most units includes a transverse rockshaft pivotally mounted on the basic unit having a lifting lever which extends under the gathering unit and one or more levers to which a counterbalancing or floatation spring and lifting cable or hydraulic cylinder may be attached. Such a control apparatus is illustrated for example in Waldrop U.S. Pat. No. 3,355,865. In such systems, the force of the floatation springs are generally adjusted by a screw or crank mechanism. Commercial systems have been built having a means for locking out the lift linkage for transport. Moreover, since it usually requires additional downward movement of the lifting lever for picking up the gathering unit, it is desirable for the floatation springs to be relaxed during this operation. This has previously been accomplished by backing off the spring adjusting screws or cranks. Some machines have been built wherein the floatation springs are fully relaxed in the transport position and could be removed from the system for pickup. However, over the range of vertical travel of the gathering unit, the floatation springs go from a zero counterbalancing condition to a maximum counterbalancing condition and the lowest operating position of the gathering unit. In the linkage described and claimed herein, when the gathering unit is in the transport position, the floatation springs provide a counterbalancing of significant proportion compared to the maximum counterbalancing force, yet this force may be relieved for picking up the gathering unit without disturbing the spring adjustments.

Yet another aspect of controlling the gathering unit is the nature of the loading imposed on the basic unit frame. In some commercial machines, the unit lifting lever is a single member generally offset to one side of the gathering unit. Others have two lifting levers. However, by attaching the lift levers to a cross tube mounted on the frame, if the loading on the gathering unit is unequal, the loading on one side or the other of the frame, both at its pivot connections therewith and at its lifting connection therewith will be unequal. If a pair of balancing springs are used on each side of the crop passage, one spring will experience a greater loading under these conditions. In the invention described herein, a single tension member is used having its ends connected to the gathering unit on either side of the housing and its medial portion looped around a movable pulley attached to the lifting floatation means. The effect of this is to equalize the loading on the frame caused by the lift system.

SUMMARY OF THE INVENTION

Accordingly, it is an object of the invention described and claimed herein to provide a control apparatus for a forage harvester gathering unit which will provide for lifting and counterbalancing of the gathering unit throughout its range of travel while enabling the floatation springs to be removed from the system for picking up the gathering unit.

Another object of the invention is to provide a means for connecting the lifting and counterbalancing mechanism to the gathering unit in a manner tending to equalize the loading of the gathering unit thereon.

Specifically, these and other objects of the invention are met in a control apparatus for controlling a gathering unit pivotally mounted on a forage harvester frame, the apparatus having a main lever pivotally mounted on the frame and operatively attached by tension apparatus to the gathering unit, a hydraulic actuator and lift lever interconnecting, through a lost motion connection, the main lever and frame for selectively engaging the main lever to lift the gathering unit, a floatation spring lever having a first pivotal connection with the main lever and a second detachable connection with the main lever, and a floatation spring assembly interconnecting the spring lever and the frame. When the detachable connection is connected, the floatation spring assembly counterbalances the gathering unit. When the detachable connection is detached, which is preferably accomplished with a lockout member engaging the spring member in the transport position to loosen the connection therebetween, the floatation springs are ineffective on the main lever. The tensioning apparatus comprises a single tension member having its respective ends operatively connected to the gathering unit on either side of the crop inlet and its medial portion operatively engaging a movable pulley associated with the main lever.

DESCRIPTION OF THE DRAWINGS

Other objects and advantages of the invention will become apparent upon reading the detailed description of the invention and upon reference to the drawings, in which.

DETAILED DESCRIPTION OF THE PREFERRED EMBODIMENT

Figure 1:
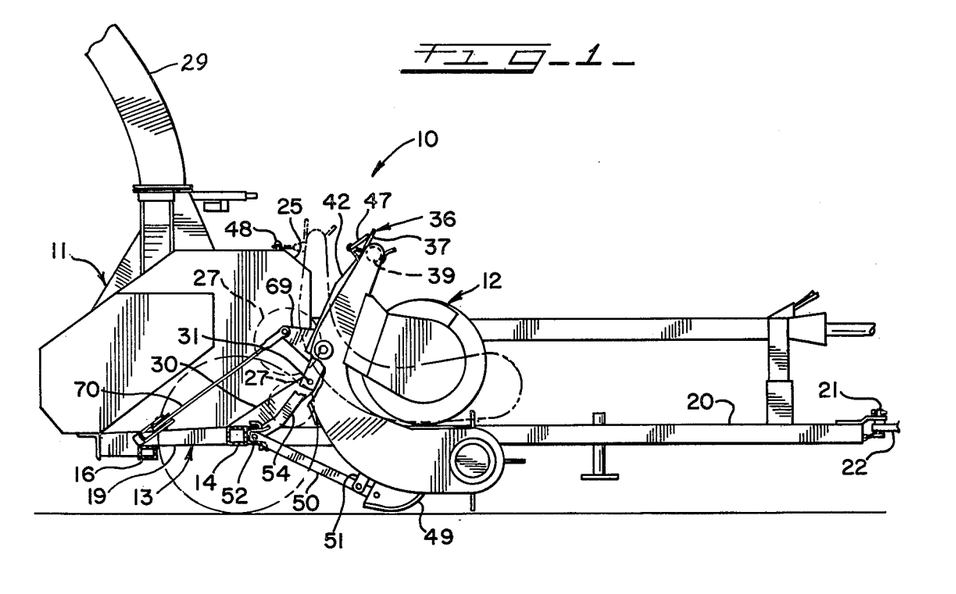
FIG. 1 is a right side view, partially in section, of a forage harvester having a hay pickup gathering unit attached thereto in the operating position, the transport position of the gathering unit being illustrated in phantom lines.
Figure 2:
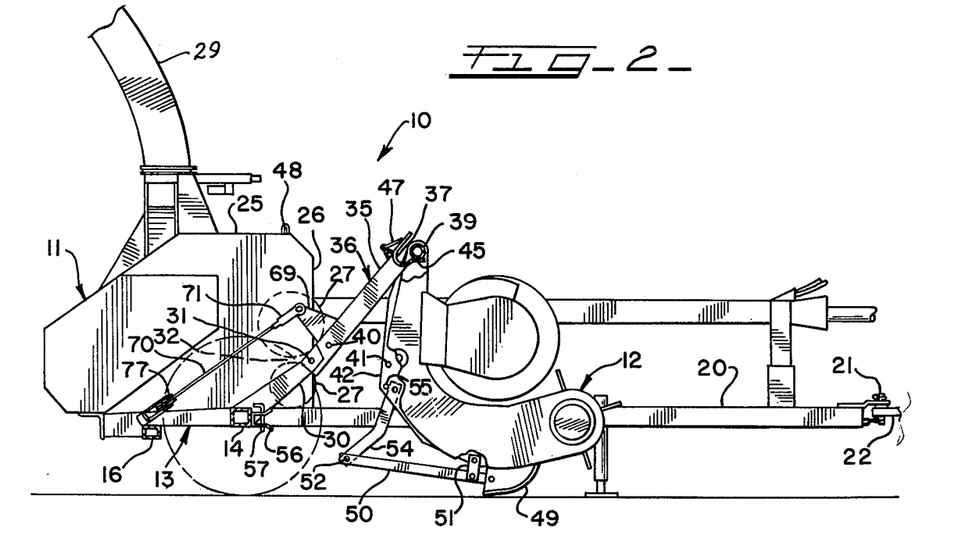
FIG. 2 is a right side view of the forage harvester of FIG. 1 with the gathering unit at the initial stage of attachment.
Figure 3:
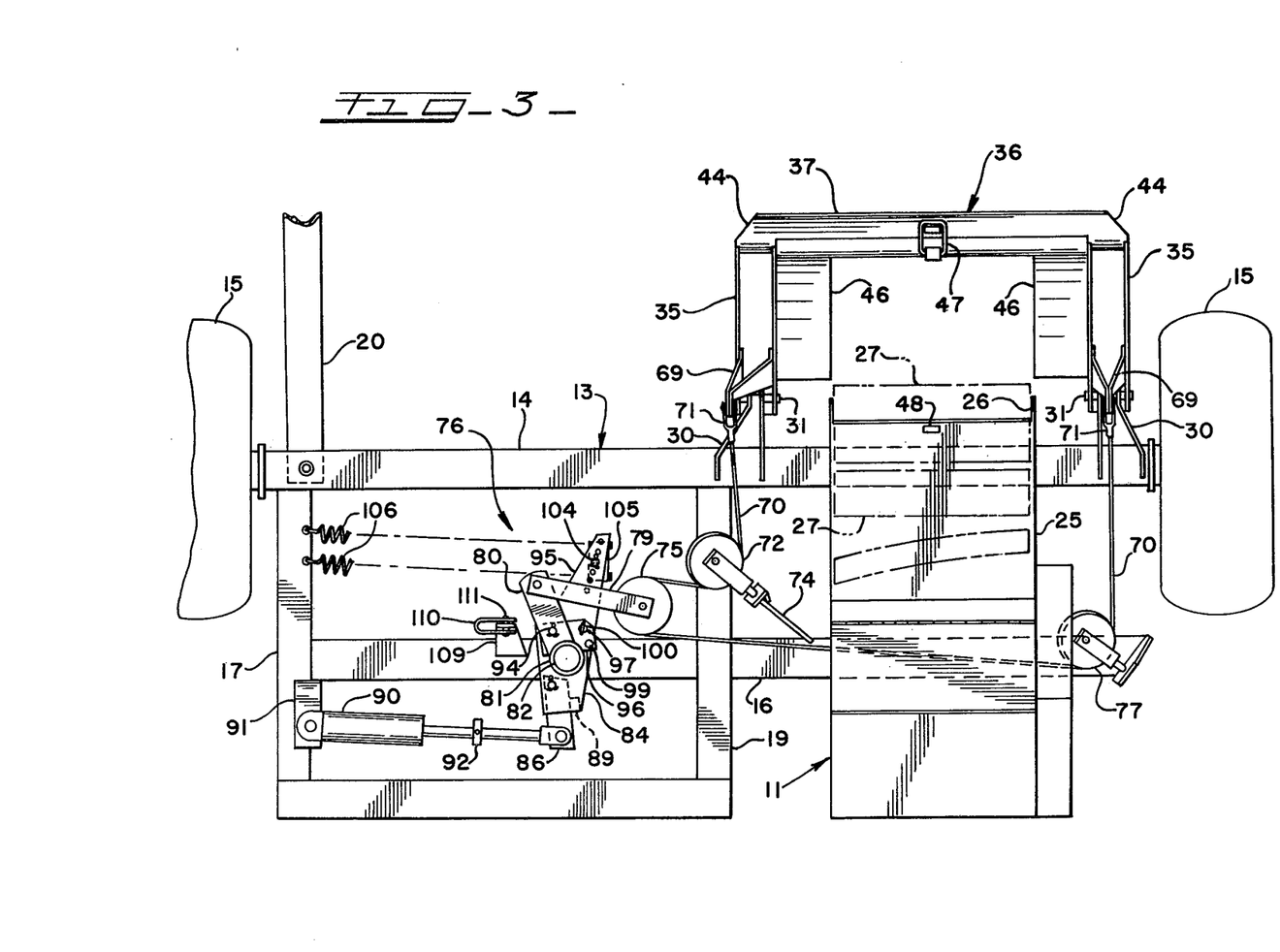
FIG. 3 is a top view of the frame, attaching yoke, and unit control apparatus of the forage harvester of FIG. 1, the crop infeed elements and cutterhead being partially illustrated in phantom lines.
Figure 4:
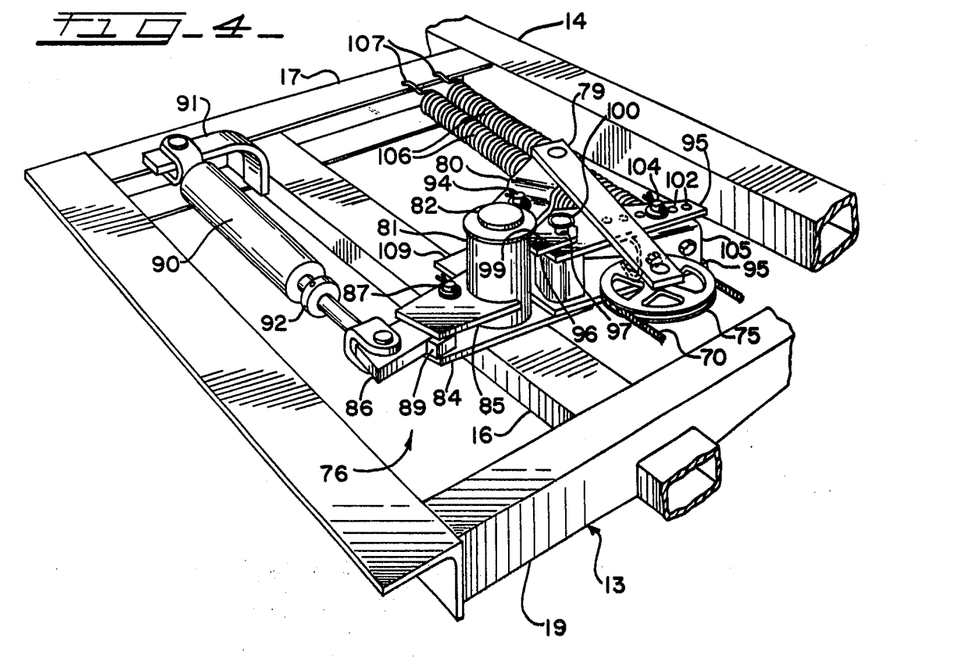
FIG. 4 is a perspective view of the control apparatus of FIG. 3.

Referring now to FIGS. 1 to 3, there is shown a forage harvester generally designated 10 including a basic processing unit generally designated 11 and a hay pickup gathering unit generally designated 12 attached thereto.

The basic processing unit 11 comprises a mobile main frame assembly 13 having a transverse axle beam 14, supported by ground wheels 15 and a rear transverse beam 16 which are interconnected as by welding by left and right fore-and-aft frame members 17 and 19 to produce a unitary structure. Pivotally mounted to the frame assembly 13 is a fore-and-aft extending hitching tongue 20 having pivot means 21 at its forward end for attaching to the drawbar 22 of a tractor (not shown). Mounted on the right side of the frame assembly 13 is a fore-and-aft extending housing 25 having a crop passage with a crop inlet 26 through which crops are fed between upper and lower feed elements or rolls 27 rearwardly in the passage to a cutterhead whereat the crops are chopped and conveyed by a suitable mechanism to a spout 29 whereat they are expelled from the forage harvester. The pulling tractor supplies mechanical, electrical, and hydraulic power for operating and controlling various components. It will be appreciated that all of the foregoing structure is well known to those in the art and is taught herein to provide an environment for the invention.

As taught in the referenced copending application, a pair of brackets 30 are welded to the transverse axle beam 14, one on each side of the housing 25 outwardly thereof. The brackets 30 extend forwardly and upwardly of the axle beam 14 to a point whereat they receive transverse pivot pins 31 in axial alignment to form a fixed transverse horizontal pivot axis located forwardly adjacent the nip 32 of the feed rolls 27, the fixed pivot axis being the line of articulation between the basic unit 11 and the gathering unit 12 during operation of the forage harvester 10 in the field.

Rotatably mounted on the pivot pins 31 are laterally spaced legs 35 of an attaching yoke 36 having a planar frame of inverted U-shape. The distal ends of the legs 35 are interconnected as by welding by a radially outwardly extending transversely elongated U-shaped cradle 37, the cradle bottom providing an auxiliary pivot axis, movable relative to the fixed pivot axis provided by pins 31, which receives a transverse pipe 39 extending across the upper portion of the gathering unit 12 above its crop feeding throat. Intermediate their ends, the legs 35 of the yoke 36 are provided with holes 40 (FIG. 2) which align with holes 41 on vertical gussets 42 on the rear of the gathering unit 12 when the transverse pipe 39 of the gathering unit is seated in the cradle 37 and the gathering unit is pivoted thereabout against the yoke. When the holes 40, 41 are aligned, pins may be inserted therethrough to secure the gathering unit to the yoke.

It can be seen in FIG. 3 that the radially outer corners of the cradle 37 are chamfered as at 44. Thus, when the yoke 36 is lowered, as in FIG. 2, and pushed toward the gathering unit 12, the chamfered portion of one corner or the other of the cradle 37 may contact the gussets 42 of the gathering unit and continued pushing will cause the gathering unit to shift lateraly to align the yoke with the gathering unit. It will also be seen in FIG. 2 that the forward edge 45 of the cradle 37 is bent forwardly somewhat to assist engagement thereof with the pipe 39. The laterally elongated nature of the cradle 37 accommodates skewing between the axis thereof and the axis of the pipe 39 in either a horizontal plane or a vertical plane by first picking up the pipe 39 at one end and guiding it into the other end as a result of forward motion of the basic unit 11 into the gathering unit 12 or as the yoke 36 is raised.

The yoke 36 is further provided with sheet metal shields 46 which fill in the space between the housing 25 and the inner sides of the legs 35 and are attached to the latter to prevent crops exiting the gathering unit from missing the crop passage inlet 26. A locking ring 47 is rotatably mounted to the rearward side of the cradle 37 and engages a U-shaped shackle 48 on the housing 25 when the yoke 36 is in the transport position. A pin may lock the ring 47 on the shackle 48 for safety during transport.

In FIG. 2, it will be seen that the lower portion of the gathering unit 12 is provided with a right ground shoe 49. A similar ground shoe and the linkage described hereinafter is also on the left side of the gathering unit. Pivotally attached to the ground shoe 49 is a lower shoe link 50 which extends rearwardly therefrom to a vertical link 51 pivotally attached thereto, the other end of the vertical link 51 being pivotally attached to the gusset 42 on the underside of the gathering unit 12. The lower shoe link 50 extends further rearwardly from the link 51 to a bifurcated rear end having a pivotal connection by a pivot pin 52 with a second vertical link 54 which is similarly pivotally connected to the gusset 42 but at a location coinciding with the pivot pins 31 when the gathering unit is attached to the yoke 36. Thus, a four bar linkage of the gathering unit 12 and the links 50, 51, and 54 is established. By inserting a pin in a hole 55 in the gusset 42 rearwardly adjacent the link 54, the linkage may be locked and can be used as a parking stand. When the gathering unit 12 is attached to the yoke 36 as described above, the linkage is unlocked by removing the pin from the hole 55 and the rear end of the shoe link 50 is inserted into a clevis 56 attached to the front side of the axle beam 14 and the pin 52 extending between the bifurcated ends of the link 50 is locked in the clevis 56 by a vertical pin 57. Due to the coincidence of the pivotal connection of the link 54 and the gusset 42 with the pivot axis of the yoke 36, the link 54 has no motion with the gathering unit attached and is ineffective in the shoe linkage.

Gathering unit control apparatus is provided for raising and lowering the yoke 36 between a generally forwardly extending gathering unit pickup position, such as shown in FIG. 2, a range of operating positions rotationally rearwardly and upwardly of the pickup position, one of which is shown in FIG. 1, and a generally upright transport position, as shown in phantom lines in FIG. 1. To this end, rearwardly extending brackets 69 are attached to intermediate portions of the legs 35 of the yoke 36 which have the opposite ends of a tension member or lifting cable 70 attached to their respective rearward ends as by pin and clevis connections 71. As shown in FIG. 3, starting with the bracket 69 on the left side of the crop inlet 26, the cable 70 extends rearwardly to an adjustably fixed idler pulley 72 mounted on a bracket 74 attached to the rear transverse beam 16. The cable 70 makes a leftward turn about the rear of the fixed pulley 72 and extends leftwardly to loop around a movable pulley 75 on a linkage apparatus 76 and extends rightwardly therefrom to a second adjustably fixed idler pulley 77 mounted at the right end of the transverse beam 16. The cable makes a forward turn about the rear of the idler pulley 77 and extends forwardly to the bracket 69 on the right side of the crop inlet. Thus, transverse movements of the movable pulley 75 caused by the linkage apparatus 76 will cause the yoke 36 to be raised or lowered as desired, the adjustments of the idler pulley 72, 77 accommodating variations in the length of the cable 70. Since the cable 70 is a single tension member, the loading at each end thereof is necessarily uniform, neglecting frictional effects.

Viewing the linkage apparatus 76 in detail and referring primarily to FIGS. 4 through 7, it will be seen that the movable pulley 75 is rotatably mounted to one end of an output link 79, the other end of the output link 79 being pivotally connected to the outer end of an output lever 80 rigidly connected to the upper end of a main hub 81 rotatably mounted on a main pivot pin 82 attached to the transverse beam 16. A main lever 84 is rigidly connected to the lower end of the main hub 81 and extends forwardly and rearwardly therefrom. A plate 85 is welded to the main hub above the rearward portion of the main lever 84 and is spaced upwardly therefrom to form a clevis in which a lift lever 86 is pivotally mounted on a pin 87 extending therethrough radially outwardly of the main hub 81. A stop block 89 is welded between the plate 85 and the main lever 84 to arrest counterclockwise rotation of the lift lever 86 relative to the main lever 84 while permitting movements in the other direction. The rod end of a double acting hydraulic actuator 90 is pivotally attached to the outer end of the lift lever 86 and the head end of the actuator 90 is pivotally attached to a bracket 91 mounted to and extending rearwardly above the rear transverse beam 16 adjacent the fore-and-aft beam 17. Mounted on the rod of the hydraulic actuator 90 is a stop collar 92 which may be secured thereto by a set screw in different positions as desired. The lost motion connection thus established between the lift lever 86 and the main hub 81 of the linkage apparatus 76 permits the actuator 90 to cause the hub to rotate counterclockwise. The hydraulic actuator 90, as limited by the stop collar 92 when the actuator is retracted, may act through the lift lever 86 and lost motion connection to prevent clockwise movement of the hub 81 beyond a predetermined point. Movement of the hub 81 and main lever 84 in the counterclockwise direction away from the lift lever 86 is permitted for purposes to be seen hereinafter.

Pivotally connected to the forward portion of the main lever 84 by a fixed pivot pin 94 is a bifurcated floatation spring lever 95, the pin 94 passing through the output lever 80 and an upper locating plate 96 attached to the hub therebeneath. The upper locating plate 96 is further provided at its right side with a forward hole 97 and a rearward parking hole 99. The forward hole 97 may receive a removable pin 100 which passes through a slotted hole 101 in the floatation spring lever 95 and a hole in the main lever 84. As will be seen, the pin 100 may also be inserted in the parking hole 99 which frees the spring lever to rotate relative to the main lever about the fixed pin 94. The outer end of the spring lever 95 is provided with a multitude of radially spaced holes 102, a selected one of which receives a saddle anchor pin 104 which pivotally positions a spring saddle 105. A pair of floatation springs 106 are connected to the saddle 105 on either side of the pin 104 and extend to anchor holes in the frame beam 17 as at 107. Slightly leftward of the main pivot pin 82 on the transverse beam 16 is a bracket having a flip lock member 110 of U-shape having its legs pivotally mounted to the bracket 109 by a fore-and-aft extending pin 111. The bracket 109 is so located that when the flip lock 110 extends rightwardly from the bracket 109, as in FIG. 6, it will contact the edge of the spring lever 95 and stop further rotation thereof about the main pivot pin 81, if the movable pin 100 is in the forward hole 97 and passing through the slot 101 in the spring lever. In its leftward position from the bracket 109, the flip lock 110 is disengaged and has no function.

Figure 5:
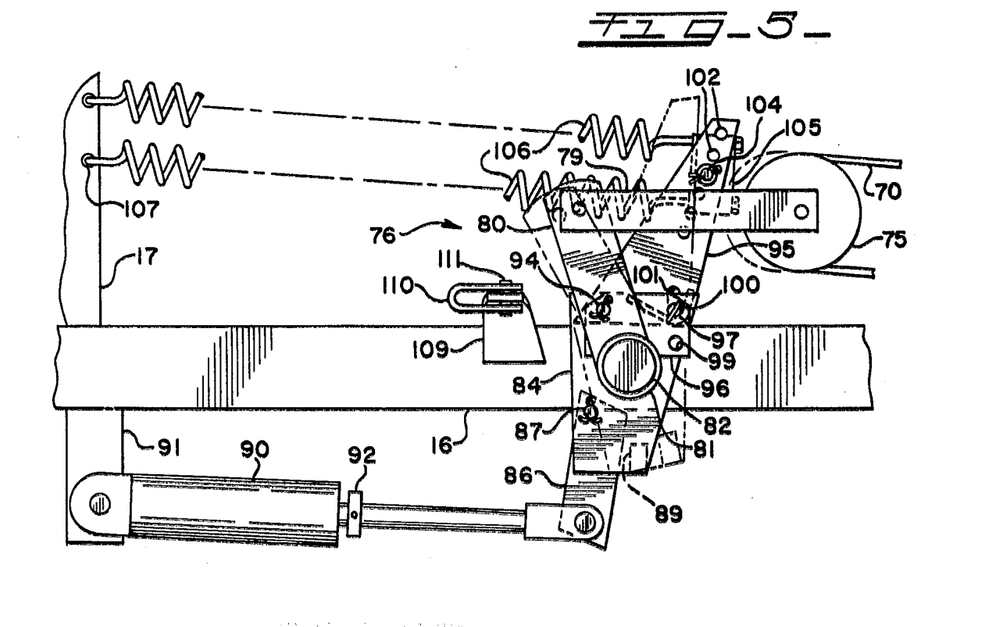
FIG. 5 is an enlarged top view of the control apparatus of FIG. 3 in the operating position, an operating range of movement thereof being illustrated in phantom lines.
Figure 7:
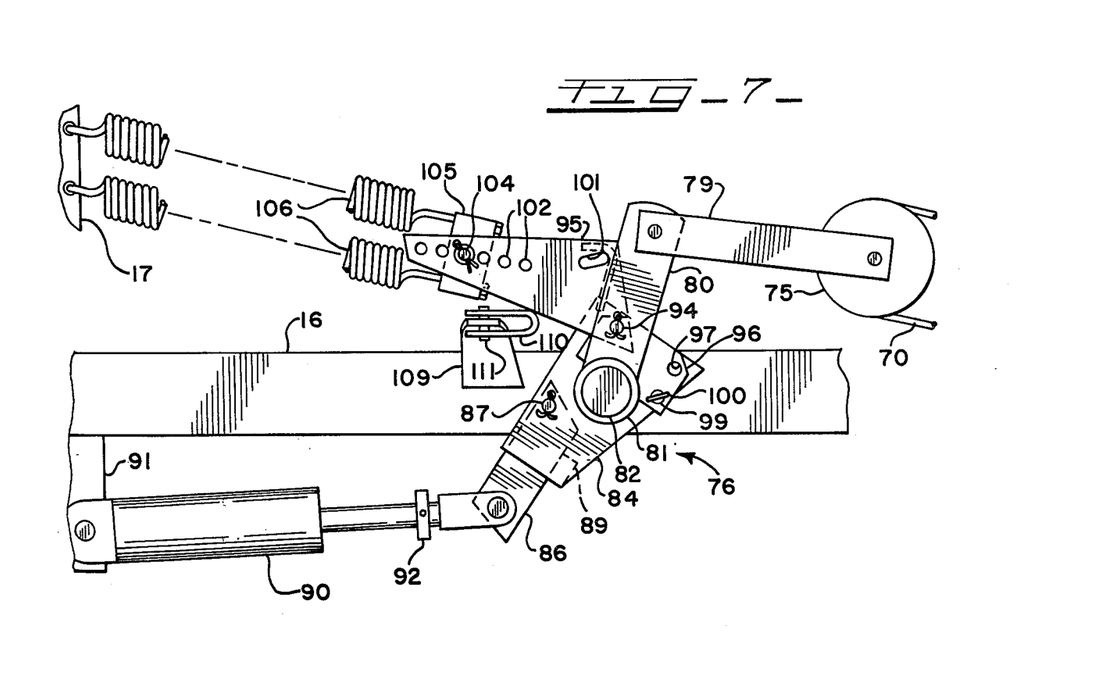
FIG. 7 is an enlarged top view of the control apparatus similar to FIGS. 5 and 6, but in the gathering unit pickup position with the floatation springs disengaged.

In operation, with the hay pickup gathering unit 12 attached to the basic unit 11, as shown in FIG. 1, the forage harvester 10 may be pulled down a field by the drawbar 22 of the tractor (not shown) and pick up crops lying thereon, the tractor supplying power in various forms for the operating components of the basic unit 11 and gathering unit 12. The gathering unit 12 is spaced from the ground by gage shoes 49 which support a portion of its weight. Upon encountering ground variations, the gathering unit 12 and yoke 36 to which it is attached articulate about the pivot pins 31, the gage shoe position adjusting about the clevis connection 56. In order to make the gathering unit more responsive to ground variation, a significant portion of its weight is carried through the cable 70 and linkage apparatus 76 by the floatation springs 106. Referring to FIG. 5 which illustrates the linkage apparatus 76 in the operating position, it can be seen that the floatation springs 106 bias the spring lever 95 in the counterclockwise direction, the flip lock 110 being leftward of the bracket in the disengaged position. With the removable pin 100 at the clockwise end of the slot 101 in the spring lever, a counterclockwise torque is exerted through the main lever 84 on the main hub 81. This torque, acting through the output lever 80, pulls the pulley 75 leftward, thus exerting a lifting force on the cable 70 and the yoke 36. The lost motion connection between the main lever 84 and the lift lever 86 permits this movement as shown. In this position with the actuator 90 retracted, the gathering unit may articulate upwardly or downwardly on its ground shoes 49 relative to the basic unit to follow the ground contour. Should the gathering unit encounter a depression, its weight, acting through the cable 70, will pull the movable pulley 75 rightward and rotate the output lever 80 and the main lever 84 clockwise against the torque imposed by the springs 106. If the hydraulic actuator 90 is not fully retracted but vented to its reservoir, the stop block 89 acting against the lift lever 86 may cause the rod of the actuator to retract until stopped by the collar 92. Indeed, if desired, the stop collar 92 could limit the downward travel of the gathering unit to a point wherein the gage shoes 49 of the gathering unit stay off the ground while providing floatation thereabove. Since the weight of the various gathering units which may be used with the forage harvester basic unit may be considerably different, the biasing torque exerted by the floatation springs 106 may be varied by relocating the saddle anchor pin 104 to a different one of the holes 102. This is easily accomplished when the spring tension is relieved as shown in FIG. 7 explained hereinafter.

Figure 6:
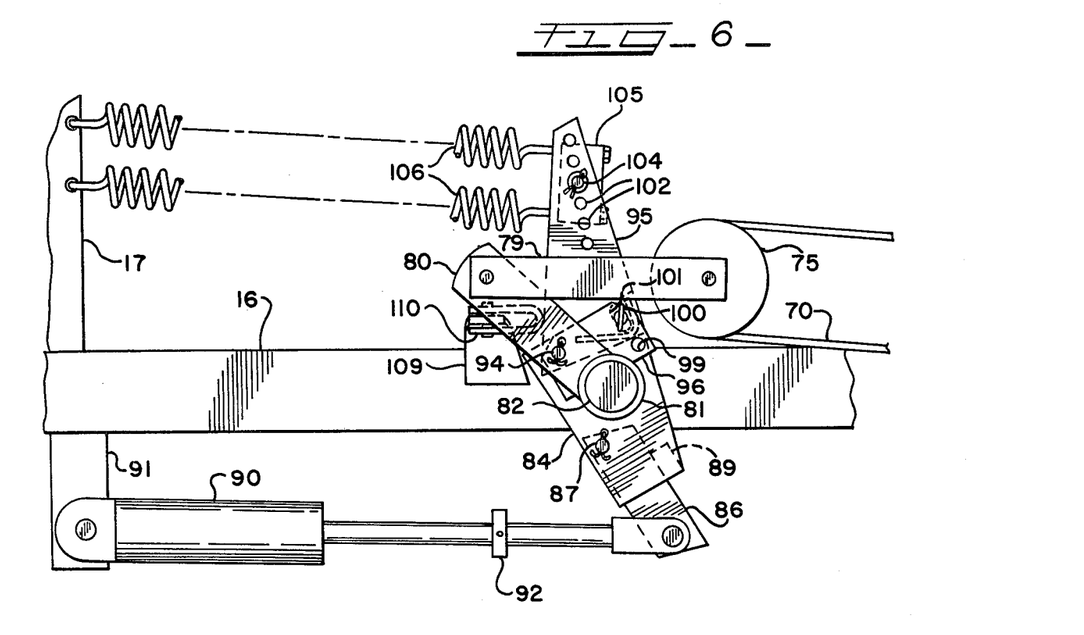
FIG. 6 is an enlarged top view of the control apparatus similar to FIG. 5, but shown in the transport position.

For transport in the field and for safety in working on or under the gathering unit, the gathering unit 12 may be placed in the transport position shown in phantom lines in FIG. 1. In this position, the yoke 36 is nearly vertical and the transport locking ring 47 thereon may be slipped over the shackle 48 on the housing 25 and secured thereto by a quick attach pin to retain the gathering unit 12 in transport position. As shown in FIG. 6, the lifting linkage is in the transport position. Although the flip lock 110 is shown in its rightward engaged position, it need not be if transport only is desired. To attain the transport position from the operating position of FIG. 5, the hydraulic actuator 90 is extended, thereby pivoting the lift lever 86 against the stop block 89 and rotating the main lever 84 and output lever counterclockwise beyond the operating position of FIG. 5. This pulls the pulley 75 leftward and raises the yoke through the cable 70.

If it is desired to remove the gathering unit 12 from the basic unit 11, the flip lock 110 is engaged and the gathering unit is raised to the transport position shown in FIG. 6 in the manner described above. When the spring lever 95 contacts the flip lock 110, it moves no further. However, the main lever 84 continues its counterclockwise motion a short distance and moves the removable pin 100 toward the center of the slot 101 in the spring lever 95. At this point, the removable pin 100 may be easily removed from the forward hole 97 in the upper locating plate 96 and placed in the rear parking hole 99 to prevent its loss. The collar 92 is moved to the outer end of the hydraulic actuator rod and the securing pins in the holes 40 and 41 securing the gathering unit 11 to the yoke 36 are removed. The rear end of the shoe links 50 are relased from the clevises 56 on the axle beam 16 and when the shoe linkage swings downwardly due to gravity, the shoes 49 being off the ground in transport position, a pin is inserted in the hole 55 to lock the shoe linkage to form a parking stand.

The transport locking ring 47 is released from the shackle 48 and the hydraulic actuator 90 is retracted. When this is done, the weight of the gathering unit acting through the cable 70, will pull the pulley 75 to the right causing the output lever 80 and main lever 84 to rotate clockwise toward the lift lever 86. As the main lever rotates clockwise, the spring lever 95 pivots about the fixed pin 94 and since the location of the fixed pin 94 rotates about the main pivot pin 82 with the main lever 84, the spring lever pivots about the flip lock 110 allowing the floatation springs 106 to collapse relieving the biasing force thereof and bringing the linkage apparatus to the position shown in FIG. 7. It is noted that the tension on the balancing springs in the transport position aids the gathering unit weight in accomplishing the foregoing. When the gathering unit contacts the ground, it will come to rest on the shoe linkage parking stand and the basic unit may then be backed away therefrom.

In this position of the linkage apparatus if it is desired to attach a different gathering unit to the basic unit, the floatation springs 106, which are no longer under tension, may be moved to utilize a different hole 102 in the spring lever 95 to produce greater or less biasing torque during operation. Moreover, the yoke 36 may fall by gravity or be easily pulled manually to a lower position if that is necessary to pick up a new gathering unit.

When attaching a new gathering unit 12 to the basic unit, the reverse of the above procedure is followed. That is, the basic unit 11 with the yoke 36 lowered, is driven up behind the gathering unit. As the basic unit is moved forward, the chamfered edges 44 of the cradle 37 of the yoke 36 may contact the gussets 42 on the gathering unit and shift it laterally for alignment. One end or the other of the bent edge 45 of the cradle 37 engages the lower side of the gathering unit transverse pipe 39, as shown in FIG. 2, and continued forward movement of the basic unit and/or lifting of the yoke will cause the pipe 39 to seat in the bottom of the cradle. The unit is raised to the transport position by extending the hydraulic actuator 90 and securing pins are inserted in the holes 40 and 41 which will align as the gathering unit swings against the yoke 36 thereby securing the gathering unit and yoke together. The shoe linkage is released and the rear pivot 52 is engaged in the clevis 56, or the parking stands are raised on other types of gathering units, and the stop collar 92 is repositioned on the rod of the hydraulic actuator in a selective limiting position.

At this point, the hydraulic actuator 90 can be retracted and the gathering unit may be lowered and operated on its ground shoes 49 without the action of the floatation springs 106, if that is desired. However, if the floatation spring action is desired, before retracting the cylinder, the removable pin 100 is inserted in the hole 97 in the upper control plate 96 with the gathering unit in the transport position, the linkage being as shown in FIG. 6. The pin 100 will extend through the slot 101 in the spring lever 95 causing engagement of the main lever 84 with the spring lever through the lost motion connection thereat and the fixed pin 94. The unit is lowered to the operating position shown in FIG. 1 and the flip lock 110 is moved to the disengaged position. The forage harvester 10 is then ready for field operation.

It is thus apparent that there has been provided, in accordance with the invention, a gathering unit control apparatus that fully satisfies the objects, aims and advantages set forth above. While the invention has been described in conjunction with a specific embodiment thereof, it is evident that alternatives, modifications, and variations will become apparent to those skilled in the art upon perusing the foregoing description. For example, although the control apparatus is described herein in connection with the attaching yoke, with a conventional gathering unit attaching means, the cable 70 would be attached to the gathering unit. Accordingly, it is intended to embrace all such alternatives, modifications, and variations as fall within the spirit and broad scope of the appended claims.

What is claimed is:

1. In a forage harvester having a basic processing unit having a frame and a crop gathering unit operatively associated with said basic unit for vertical articulative movement relative thereto about a transverse pivot axis, control apparatus for said gathering unit comprising:

a main lever pivotally mounted on said frame and having output means operatively connected to said gathering unit for pivoting said gathering unit about said transverse axis, the weight of said gathering unit imposing a first torque through said output means on said main lever;

a floatation spring lever having a first pivotal connection and a second detachable connection with said main lever;

floatation spring means interconnecting said floatation spring lever and said frame, said spring means imposing through said spring lever a balancing torque in opposition to said first torque on said main lever upon said detachable connection therebetween being in the attached state and said spring means imposing no balancing torque on said main lever upon said detachable connection being in the detached state; and lift means interconnecting said main lever and said frame for selectively exerting a lifting torque in opposition to said first torque on said main lever.

2. In a forage harvester having a basic processing unit having a frame and a crop gathering unit operatively associated with said basic unit for vertical articulative movement relative thereto about a transverse pivot axis, control apparatus for said gathering unit comprising:

a main lever pivotally mounted on said frame having output means operatively connected to said gathering unit for pivoting said gathering unit about said transverse axis, the weight of said gathering unit imposing a first torque through said output means on said main lever;

a floatation spring lever having a first pivotal connection and a second detachable connection with said main lever;

floatation spring means interconnecting said floatation spring lever and said frame, said spring means imposing through said spring lever a balancing torque in opposition to said first torque on said main lever upon said detachable connection therebetween being in the attached state;

a selectively engageable means for limiting the travel of said spring lever in the direction relaxing said floatation spring means to facilitate detaching said detachable connection between said spring lever and said main lever; and lift means interconnecting said main lever and said frame for selectively exerting a lifting torque in opposition to said first torque on said main lever.

3. The invention in accordance with claim 2 and said detachable connection between said spring lever and said main lever comprising a lost motion connection, said main lever overtravelling said spring lever when said selectively engageable limiting means limits the travel of said spring lever.

4. The invention in accordance with claim 3 and said pivotal connection between said spring lever and said main lever being removed from the axis of rotation of said main lever such that upon said spring lever engaging said selectively engageable limiting means and said detachable connection between said spring lever and said main lever being detached, rotation of said main lever due to the weight of said gathering unit will cause said spring lever to pivot about said selectively engageable limiting means and relax said springs.

5. In a forage harvester having a basic processing unit having a frame and a crop gathering unit operatively associated with said basic unit for vertical articulative movement relative thereto about a transverse pivot axis, control apparatus for said gathering unit comprising:

a main lever pivotally mounted on said frame having output means operatively connected to said gathering unit for pivoting said gathering unit about said transverse axis, the weight of said gathering unit imposing a first torque through said output means on said main lever;

a floatation spring lever having a first pivotal connection and a second detachable connection with said main lever;

floatation spring means interconnecting said floatation spring lever and said frame, said spring means imposing through said spring lever a balancing torque in opposition to said first torque on said main lever upon detachable connection therebetween being in the attached state;

lift means interconnecting said main lever and said frame for selectively exerting a lifting torque in opposition to said first torque on said main lever; and said lift means comprising a lift lever pivotally mounted to said main lever and having a lost motion connection therewith and an actuating means for moving said lift lever against said main lever.

6. The invention in accordance with claim 5 and said spring lever having a plurality of radially spaced selectable means for attaching said floatation spring means thereto for providing one of a plurality of selectively variable balancing torques in opposition to said first torque.

7. The invention in accordance with claim 5 and said actuating means comprising a linear hydraulic actuator and selectively positionable limiting means for limiting the retraction of said actuator.

8. The invention in accordance with claim 5 and a yoke pivotally attached to said basic processing unit frame for rotation about said transverse pivot axis, said gathering unit being detachably connected to said yoke for movement therewith, said output means being connected to said yoke.

9. In a forage harvester having a basic processing unit having a frame and a crop gathering unit operatively associated with said basic unit for vertical articulative movement relative thereto about a transverse pivot axis, control apparatus for said gathering unit comprising:

a main lever pivotally mounted on said frame having output means operatively connected to said gathering unit for pivoting said gathering unit about said transverse axis, the weight of said gathering unit imposing a first torque through said output means on said main lever, said main lever output means including an output arm, a tension means operatively attached to said gathering unit, and means connecting said tension means to said output arm at the distal end thereof;

a floatation spring lever having a first pivotal connection and a second detachable connection with said main lever;

floatation spring means interconnecting said floatation spring lever and said frame, said spring means imposing through said spring lever a balancing torque in opposition to said first torque on said main lever upon said detachable connection therebetween being in the attached state; and lift means interconnecting said main lever and said frame for selectively exerting a lifting torque in opposition to said first torque on said main lever.

10. The invention in accordance with claim 9 and said tension means comprising a tension member having its ends operatively attached respectively to each side of said gathering unit, the medial portion of said tension member operatively engaging a pulley operatively attached to said output arm for movement therewith.

11. The invention in accordance with claim 10 and said pulley being rotatably mounted on a link, the distal end of said link being pivotally attached to said output arm.

12. In a forage harvester having a frame having a crop inlet and a gathering unit for delivering crops to said inlet operatively mounted thereto for pivotal movement about a transverse axis, said gathering unit having a raised transport position and a range of lowered operating positions, apparatus for controlling said gathering unit comprising tension means operatively connected to said gathering unit, a main lever assembly pivotally mounted on said frame and operatively connected to said tension means, lifting means for rotating said main lever assembly in a direction lifting said gathering unit to said transport position, said lifting means having a lost motion connection with said main lever assembly permitting rotation of said main lever assembly beyond said lifting means, a floatation spring lever having a first pivotal connection relative to said main lever assembly and a second detachable connection therewith, floatation spring means interconnecting said spring lever and said frame and biasing said main lever assembly to counterbalance the weight of said gathering unit upon said detachable connection of said spring lever and said main lever assembly being attached, said floatation spring means being ineffective on said main lever assembly upon said detachable connection being detached.

13. The invention in accordance with claim 12 and lockout means mounted on said frame for limiting the travel of said spring lever, said lockout means being effective to relieve the loading on said detachable connection when said gathering unit is raised to the transport position.

14. The invention in accordance with claim 13 and said detachable connection between said spring lever and said main lever assembly being a lost motion connection, said main lever assembly overtraveling said spring lever in said transport position when said lockout means is engaged by said spring lever.

15. The invention in accordance with claim 12 and an attaching yoke pivotally mounted on said frame for pivotable movement about said transverse axis, said gathering unit being detachably mounted to said yoke, said tension means comprising a tension member having both ends attached to said yoke respectively on each side of said crop inlet and a medial portion thereof operatively engaging a movable pulley operatively connected to said main lever assembly at a point radially outwardly of the center of rotation thereof.

* * * * *